United States Patent
Seo et al.

(10) Patent No.: US 9,467,889 B2
(45) Date of Patent: Oct. 11, 2016

(54) METHOD AND DEVICE FOR ENABLING LIMITED MEASUREMENT IN FREQUENCY DOMAIN IN WIRELESS COMMUNICATION SYSTEM

(71) Applicant: LG ELECTRONICS INC., Seoul (KR)

(72) Inventors: Hanbyul Seo, Anyang-si (KR); Seungmin Lee, Anyang-si (KR); Byounghoon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/429,295

(22) PCT Filed: Sep. 4, 2013

(86) PCT No.: PCT/KR2013/007974
§ 371 (c)(1),
(2) Date: Mar. 18, 2015

(87) PCT Pub. No.: WO2014/046399
PCT Pub. Date: Mar. 27, 2014

(65) Prior Publication Data
US 2015/0237518 A1    Aug. 20, 2015

Related U.S. Application Data

(60) Provisional application No. 61/703,785, filed on Sep. 21, 2012.

(51) Int. Cl.
*H04W 24/10* (2009.01)
*H04L 5/00* (2006.01)
*H04W 88/02* (2009.01)

(52) U.S. Cl.
CPC ............ *H04W 24/10* (2013.01); *H04L 5/0007* (2013.01); *H04L 5/0048* (2013.01); *H04W 88/02* (2013.01)

(58) Field of Classification Search
CPC .. H04W 24/10; H04W 88/02; H04L 5/0007; H04L 5/0048
See application file for complete search history.

(56) References Cited

U.S. PATENT DOCUMENTS

| | | | |
|---|---|---|---|
| 2012/0088516 A1* | 4/2012 | Ji | H04L 1/0027 455/452.1 |
| 2012/0113850 A1* | 5/2012 | Fu | H04W 72/1231 370/252 |
| 2013/0225188 A1 | 8/2013 | Seo et al. | |
| 2013/0229931 A1* | 9/2013 | Kim | H04W 24/10 370/252 |
| 2013/0286883 A1 | 10/2013 | Kim et al. | |
| 2013/0322273 A1* | 12/2013 | Etemad | H04W 24/10 370/252 |
| 2014/0119334 A1* | 5/2014 | Kazmi | H04L 5/0032 370/330 |
| 2014/0126403 A1* | 5/2014 | Siomina | H04W 24/10 370/252 |

FOREIGN PATENT DOCUMENTS

| | | |
|---|---|---|
| KR | 10-2012-0049134 A | 5/2012 |
| WO | WO 2012/067403 A2 | 5/2012 |
| WO | WO 2012/070823 A2 | 5/2012 |
| WO | WO 2012/099389 A2 | 7/2012 |

* cited by examiner

*Primary Examiner* — Kenneth Lam
(74) *Attorney, Agent, or Firm* — Birch, Stewart, Kolasch & Birch, LLP

(57) ABSTRACT

The present application discloses a method of performing a measurement for radio resource management (RRM) by user equipment in a wireless communication system. In particular, the method includes: receiving information on the low-power frequency band of an adjacent cell for the RRM from a serving cell; performing a measurement on the low-power frequency band for the RRM using a reference signal received at a preset period; and reporting the result of the measurement to the serving cell.

8 Claims, 9 Drawing Sheets

FIG. 2
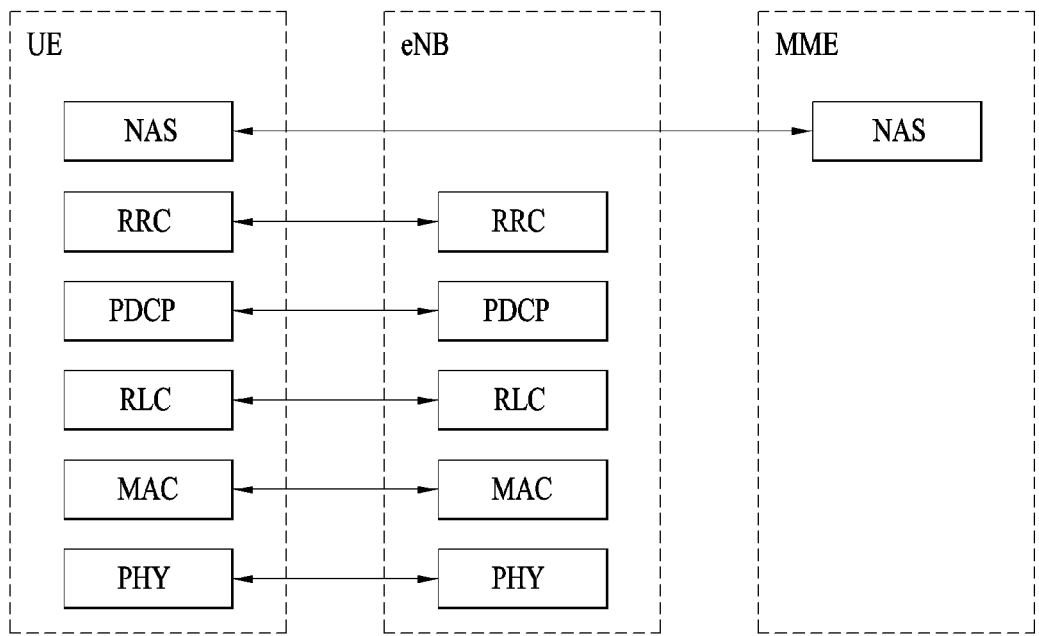
(a) control plane protocol stack
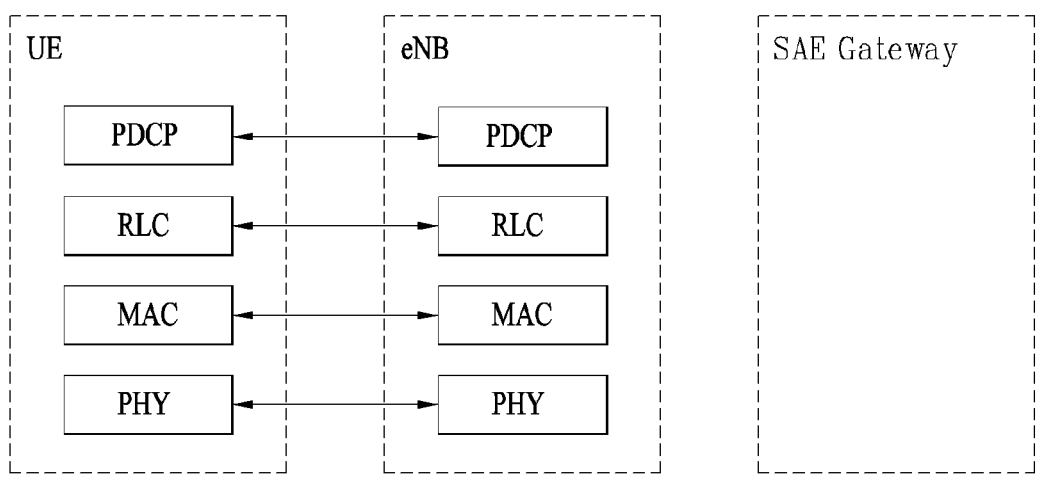
(b) user plane protocol stack FIG. 7
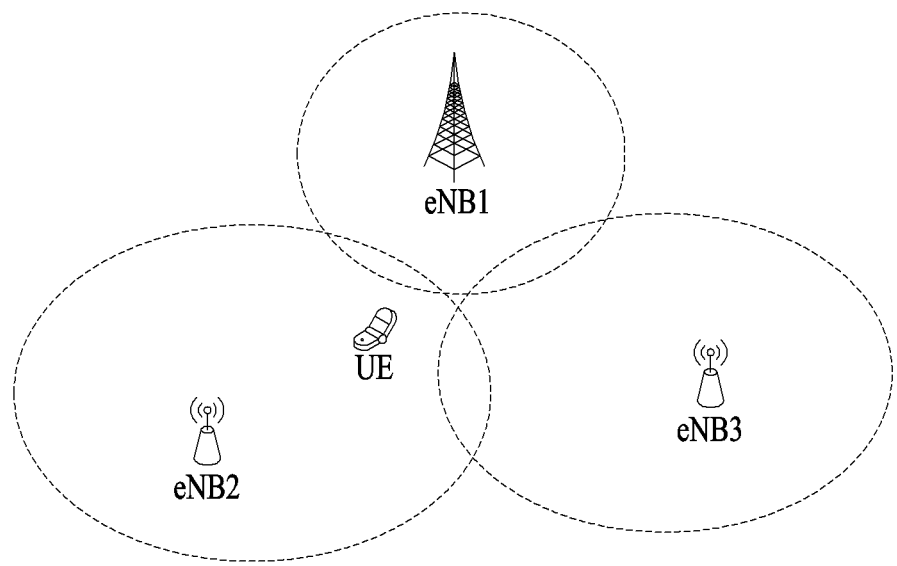
FIG. 8
 low power subframe indicated by eNB1
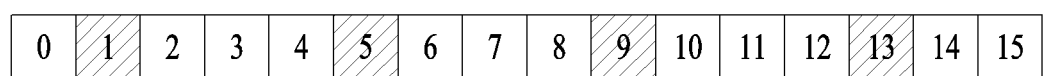
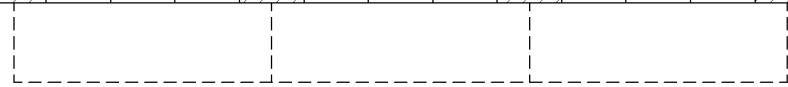
subframes used for UEs receiving
strong interference from eNB1

METHOD AND DEVICE FOR ENABLING LIMITED MEASUREMENT IN FREQUENCY DOMAIN IN WIRELESS COMMUNICATION SYSTEM

CROSS REFERENCE TO RELATED APPLICATIONS

This application is a National Stage application of a PCT International Application No. PCT/KR2013/007974, filed on Sep. 4, 2013, which claims priority under 35 U.S.C. 119(e) to U.S. Provisional Application No. 61/703,785, filed on Sep. 21, 2012, all of which are hereby expressly incorporated by reference into the present application.

TECHNICAL FIELD

The present invention relates to a wireless communication system, and more particularly, to a method of performing a limited measurement in frequency domain in a wireless communication system and an apparatus therefor.

BACKGROUND ART

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE OF THE INVENTION

Technical Task

A technical task of the present invention is to propose a method of performing a limited measurement in frequency domain in a wireless communication system and an apparatus therefor based on the discussion described in the foregoing description.

Technical Solution

To achieve these and other advantages and in accordance with the purpose of the present invention, according to one embodiment, a method of performing a measurement for RRM (radio resource management), which is performed by a user equipment in a wireless communication system, includes the steps of receiving information on a low power frequency band of a neighboring cell for the RRM from a serving cell, performing measurement on the low power frequency band for the RRM using a reference signal received with a predetermined period and reporting a result of the measurement to the serving cell.

To further achieve these and other advantages and in accordance with the purpose of the present invention, according to a different embodiment, a user equipment in a wireless communication system includes a reception module configured to receive information on a low power frequency band of a neighboring cell for RRM (radio resource management) from a serving cell and receive a reference signal received with a predetermined period, a processor configured to perform a measurement on the low power frequency band for the RRM using the reference signal and a transmission module configured to report a result of the measurement to the serving cell.

In the aforementioned embodiments, the information on the low power frequency band for the RRM is valid in a subframe in which the reference signal is received. In addition, the method can further include the step of receiving the information on the low power frequency band of the neighboring cell, which is used for receiving data, from the serving cell. In this case, the information on the low power frequency band for the RRM is valid in a subframe in which the reference signal is received. On the contrary, the information on the low power frequency band of the neighboring cell, which is used for receiving the data, is valid in a subframe in which the reference signal is not received.

Preferably, the information on the low power frequency band for the RRM can include information on at least one or more resource block indexes to perform the measurement. In this case, the at least one or more resource block indexes are defined on the basis of one selected from the group consisting of a bandwidth of the serving cell, a maximum bandwidth and a predetermined bandwidth. In addition, the at least one or more resource block indexes vary according to a change of a time resource.

Advantageous Effects

According to embodiments of the present invention, a user equipment can more efficiently perform a limited measurement in frequency domain in a wireless communication.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 2 is a diagram illustrating structures of a control plane and a user plane of a radio interface protocol between a UE and an E-UTRAN based on the 3GPP radio access network specification.

FIGS. 6 and 7 are diagrams illustrating a configuration of a heterogeneous network to explain a limited measurement technique.

FIG. 8 is a diagram illustrating a legacy limited measurement technique.

BEST MODE

Mode for Invention

Figure 1:
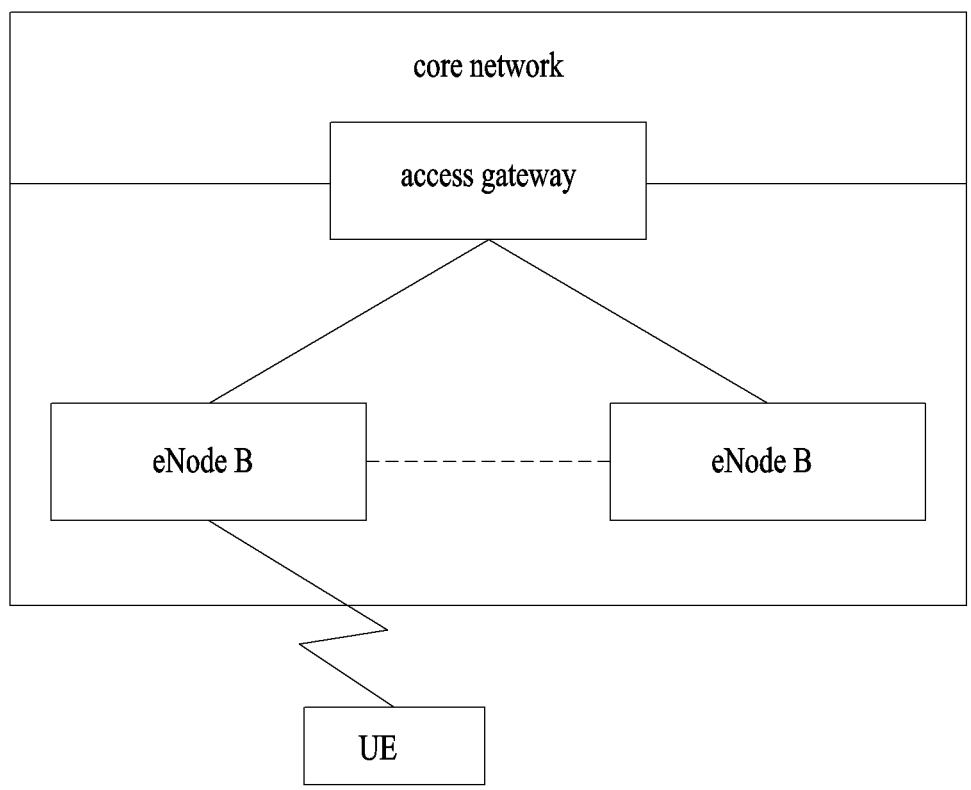
FIG. 1 is a diagram schematically illustrating a network structure of an E-UMTS as an exemplary radio communication system.

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
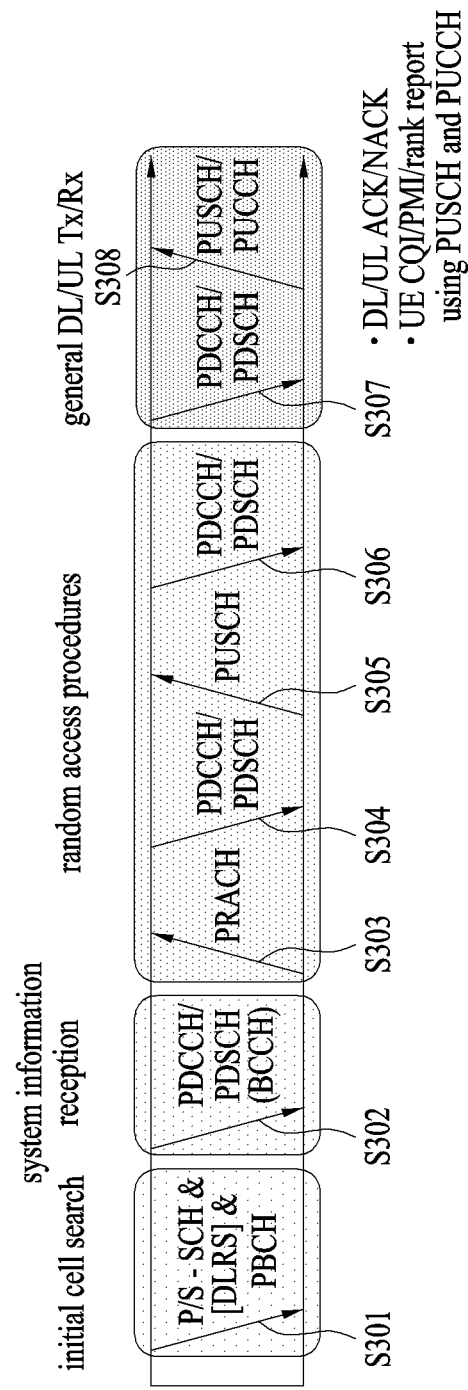
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
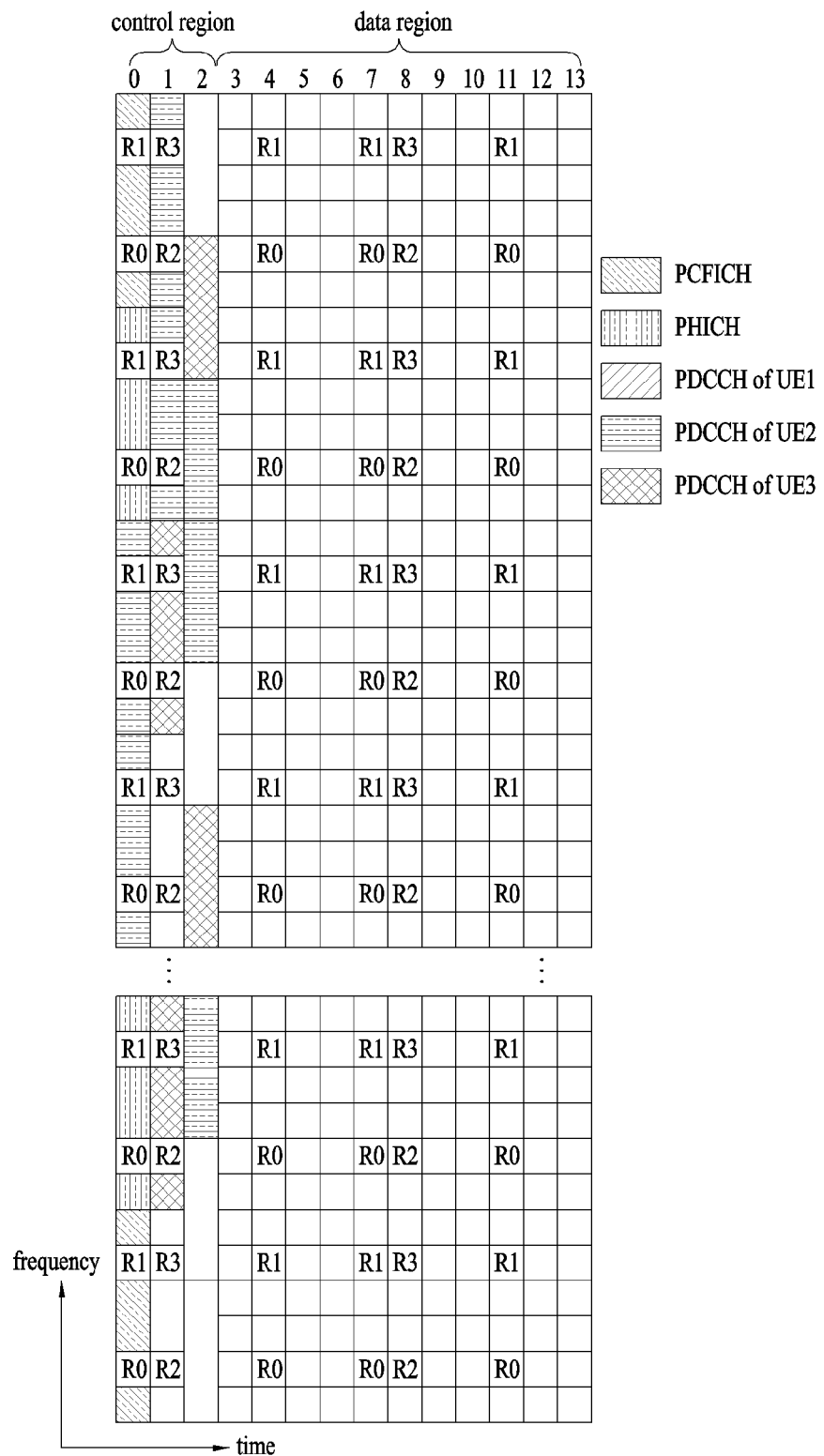
FIG. 4 is a diagram illustrating the structure of a DL radio frame used in an LTE system.

FIG. 4 is a diagram illustrating control channels contained in a control region of one subframe in a DL radio frame.

Figure 5:
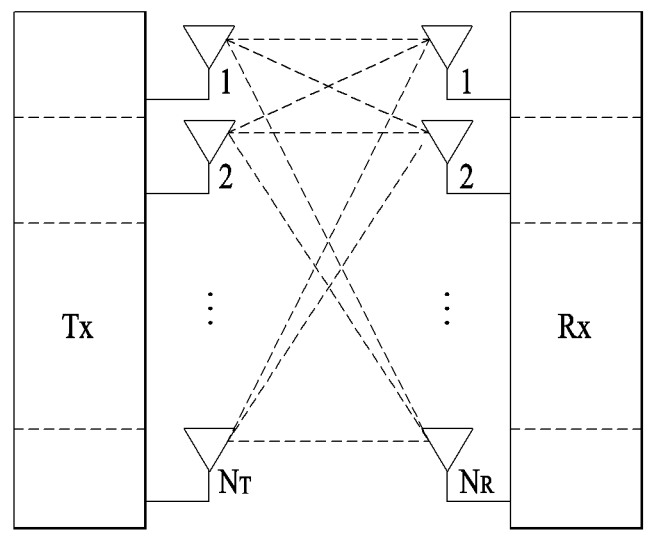
FIG. 5 is a diagram illustrating a configuration of a general MIMO communication system.

Referring to FIG. 4, one subframe includes 14 OFDM symbols. The first to third ones of the 14 OFDM symbols may be used as a control region and the remaining 11 to 13 OFDM symbols may be used as a data region, according to subframe configuration. In FIGS. 5, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK).

The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Hereinafter, a MIMO system will be described. MIMO refers to a method using multiple transmit antennas and multiple receive antennas to improve data transmission/reception efficiency. Namely, a plurality of antennas is used at a transmitter or a receiver of a wireless communication system so that capacity can be increased and performance can be improved. MIMO may also be referred to as multi-antenna in this disclosure.

MIMO technology does not depend on a single antenna path in order to receive a whole message. Instead, MIMO technology completes data by combining data fragments received via multiple antennas. The use of MIMO technology can increase data transmission rate within a cell area of a specific size or extend system coverage at a specific data transmission rate. MIMO technology can be widely used in mobile communication terminals and relay nodes. MIMO technology can overcome a limited transmission capacity encountered with the conventional single-antenna technology in mobile communication.

FIG. 5 illustrates the configuration of a typical MIMO communication system.

A transmitter has NT transmit (Tx) antennas and a receiver has NR receive (Rx) antennas. Use of a plurality of antennas at both the transmitter and the receiver increases a theoretical channel transmission capacity, compared to the use of a plurality of antennas at only one of the transmitter and the receiver. Channel transmission capacity increases in proportion to the number of antennas. Therefore, transmission rate and frequency efficiency are increased. Given a maximum transmission rate Ro that may be achieved with a single antenna, the transmission rate may be increased, in theory, to the product of Ro and a transmission rate increase rate Ri in the case of multiple antennas, as indicated by Equation 1. Ri is the smaller of NT and NR.

$$R_i = \min(N_T, N_R) \quad \text{[Equation 1]}$$

For example, a MIMO communication system with four Tx antennas and four Rx antennas may theoretically achieve a transmission rate four times that of a single antenna system. Since the theoretical capacity increase of the MIMO wireless communication system was verified in the mid-1990s, many techniques have been actively developed to increase data transmission rate in real implementations. Some of these techniques have already been reflected in various wireless communication standards including standards for 3rd generation (3G) mobile communications, next-generation wireless local area networks, etc.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transmission rate.

Communication in a MIMO system will be described in detail through mathematical modeling. It is assumed that NT Tx antennas and NR Rx antennas are present as illustrated in FIG. 5. Regarding a transmission signal, up to NT pieces of information can be transmitted through the NT Tx antennas, as expressed as the following vector.

$$s = [s_1, s_2, \ldots, s_{N_T}]^T \quad \text{([Equation 2])}$$

Individual pieces of the transmission information $s_1, s_2, \ldots, s_{N_T}$ may have different transmit powers. If the individual transmit powers are denoted by $P_1, P_2, \ldots, P_{N_T}$, respectively, then the transmission power-controlled transmission information may be given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{S}$ may be expressed below, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, NT transmission signals $x_1, x_2, \ldots, x_{N_T}$ to be actually transmitted may be configured by multiplying the transmission power-controlled information vector $\hat{S}$ by a weight matrix W. The weight matrix W functions to appropriately distribute the transmission information to individual antennas according to transmission channel states, etc. The transmission signals $x_1, x_2, \ldots, x_{N_T}$ are represented as a vector X, which may be determined by Equation 5. Here, $w_{ij}$ denotes a weight of an i-th Tx antenna and a j-th piece of information. W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

Generally, the physical meaning of the rank of a channel matrix is the maximum number of different pieces of information that can be transmitted on a given channel. Therefore, the rank of a channel matrix is defined as the smaller of the number of independent rows and the number of independent columns in the channel matrix. Accordingly, the rank of the channel matrix is not larger than the number of rows or columns of the channel matrix. The rank of the channel matrix H (rank(H)) is restricted as follows.

$$\text{rank}(H) \leq \min(N_T, N_R) \quad \text{[Equation 6]}$$

A different piece of information transmitted in MIMO is referred to as a transmission stream or stream. A stream may also be called a layer. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R) \quad \text{[Equation 7]}$$

"# of streams" denotes the number of streams. It should be noted that one stream may be transmitted through one or more antennas.

One or more streams may be mapped to a plurality of antennas in many ways. This method may be described as follows depending on MIMO schemes. If one stream is transmitted through a plurality of antennas, this may be regarded as spatial diversity. When a plurality of streams is transmitted through a plurality of antennas, this may be spatial multiplexing. A hybrid scheme of spatial diversity and spatial multiplexing may be contemplated.

It is expected that the next-generation mobile communication standard, LTE-A, will support coordinated multipoint (CoMP) transmission in order to increase data transmission rate, compared to the legacy LTE standard. CoMP refers to transmission of data to a UE through cooperation among two or more eNBs or cells in order to increase communication performance between a UE located in a shadow area and an eNB (a cell or sector).

CoMP transmission schemes may be classified into CoMP-Joint processing (CoMP-JP) called cooperative MIMO characterized by data sharing, and CoMP-coordinated scheduling/beamforming (CoMP-CS/CB).

In DL CoMP-JP, a UE may instantaneously receive data simultaneously from eNBs that perform CoMP transmission and may combine the received signals, thereby increasing reception performance (joint transmission (JT)). In addition, one of the eNBs participating in the CoMP transmission may transmit data to the UE at a specific time point (dynamic point selection (DPS)).

In contrast, in downlink CoMP-CS/CB, a UE may receive data instantaneously from one eNB, that is, a serving eNB by beamforming.

In UL CoMP-JP, eNBs may receive a PUSCH signal from a UE at the same time (joint reception (JR)). In contrast, in UL CoMP-CS/CB, only one eNB receives a PUSCH from a UE. Here, cooperative cells (or eNBs) may make a decision as to whether to use CoMP-CS/CB.

Hereinbelow, a description of channel state information (CSI) reporting will be given. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI in order to obtain multiplexing gain of MIMO antennas. To acquire CSI from the UE, the eNB transmits RSs to the UE and commands the UE to feed back CSI measured based on the RSs through a PUCCH or a PUSCH.

CSI is divided into three types of information: an RI, a PMI, and a CQI.

First, RI is information on a channel rank as described above and indicates the number of streams that can be received via the same time-frequency resource. Since RI is determined by long-term fading of a channel, it may be generally fed back at a cycle longer than that of PMI or CQI.

Second, PMI is a value reflecting a spatial characteristic of a channel and indicates a precoding matrix index of the eNB preferred by the UE based on a metric of signal-to-interference plus noise ratio (SINR). Lastly, CQI is information indicating the strength of a channel and indicates a reception SINR obtainable when the eNB uses PMI.

An advanced system such as an LTE-A system considers additional multi-user diversity through multi-user MIMO (MU-MIMO). Due to interference between UEs multiplexed in an antenna domain in MU-MIMO, the accuracy of CSI may significantly affect interference with other multiplexed UEs as well as a UE that reports the CSI. Accordingly, more accurate CSI than in single-user MIMO (SU-MIMO) should be reported in MU-MIMO.

In this context, the LTE-A standard has determined to separately design a final PMI as a long-term and/or wideband PMI, W1, and a short-term and/or subband PMI, W2.

For example, a long-term covariance matrix of channels expressed as Equation 8 may be used for hierarchical codebook transformation that configures one final PMI with W1 and W2.

$$W=\mathrm{norm}(W1\ W2) \quad \text{[Equation 8]}$$

In Equation 8, W2 is a short-term PMI, which is a codeword of a codebook reflecting short-term channel information, W is a codeword of a final codebook, and norm (A) is a matrix obtained by normalizing each column of matrix A to 1.

Conventionally, the codewords W1 and W2 are given as Equation 9.

$$W1(i) = \begin{bmatrix} X_i & 0 \\ 0 & X_i \end{bmatrix}, \text{ where } X_i \text{ is } Nt/2 \text{ by } M \text{ matrix.} \quad \text{[Equation 9]}$$

$$W2(j) = \begin{bmatrix} e_M^k & e_M^l & & e_M^m \\ & & \cdots & \\ \alpha_j e_M^k & \beta_j e_M^l & & \gamma_j e_M^m \end{bmatrix} \text{ (if rank = } r\text{),}$$

where $1 \le k, l, m \le M$ and $k, l, m$ are integer.

In Equation 9, the codewords are designed so as to reflect correlation characteristics between established channels, if cross-polarized antennas are densely arranged, for example, the distance between adjacent antennas is equal to or less than half a signal wavelength. The cross-polarized antennas may be divided into a horizontal antenna group and a vertical antenna group and the two antenna groups are co-located, each having the property of a uniform linear array (ULA) antenna.

Therefore, the correlations between antennas in each group have the same linear phase increment property and the correlation between the antenna groups is characterized by phase rotation. Since a codebook is quantized values of channels, it is necessary to design a codebook reflecting channel characteristics. For convenience of description, a rank-1 codeword designed in the above manner may be given as Equation 10.

$$W1(i)*W2(j) = \begin{bmatrix} X_i(k) \\ \alpha_j X_i(k) \end{bmatrix} \quad \text{[Equation 10]}$$

In Equation 10, a codeword is expressed as an $N_T \times 1$ vector where NT is the number of Tx antennas and the codeword is composed of an upper vector $x_i(k)$ and a lower vector $\alpha_j x_i(k)$, representing the correlation characteristics of the horizontal and vertical antenna groups, respectively. $x_i(k)$ is expressed as a vector having the linear phase increment property, reflecting the correlation characteristics between antennas in each antenna group. For example, a discrete Fourier transform (DFT) matrix may be used for $x_i(k)$.

An advanced system such as an LTE-A system considers achievement of an additional multi-user diversity by the use of MU-MIMO. Due to the existence of interference channels between UEs multiplexed in an antenna domain in MU-MIMO, the accuracy of CSI may significantly affect interference with other multiplexed UEs as well as a UE that reports the CSI. Accordingly, more accurate CSI than in SU-MIMO should be reported in MU-MIMO.

In CoMP JT, because a plurality of eNBs transmits the same data to a specific UE through cooperation, the eNBs may be theoretically regarded as forming a MIMO system with antennas distributed geographically. That is, even when MU-MIMO is implemented in JT, highly accurate CSI is required to avoid interference between CoMP-scheduled UEs as in a single cell MU-MIMO operation. The same applies to CoMP CB. That is, to avoid interference with a serving cell caused by a neighbor cell, accurate CSI is needed. In general, a UE needs to report an additional CSI feedback in order to increase the accuracy of CSI feedback. The CSI feedback is transmitted on a PUCCH or a PUSCH to an eNB.

Meanwhile, in a multi cell environment, each UE is connected with a most suitable cell, configures the cell as a serving cell and considers the cell as a provider of a communication service. In some cases, when a UE is capable of managing a plurality of cells as a serving cell, two or more serving cells can be configured. In this case, one of a plurality of the serving cells is configured as a primary cell and the primary cell can be considered as a provider of a more preferential communication service.

In order for a UE to connect with a suitable serving cell, channel state information between a plurality of neighboring cells and the UE should be reported to a network. RSRP (reference signal received power)/RSRQ (reference signal received quality) corresponds to a measurement value used for reporting the channel state information.

An operation enabling a network to select a suitable serving cell in a manner of measuring/reporting such information as the RSRP or the RSRQ in response to a reference signal transmitted by each of a plurality of cells is called RRM (radio resource management).

After a serving cell is configured, it is necessary to have a handover process in which a communication problem of a prescribed period and/or a prescribed level occurs to change the serving cell. Hence, in order to prevent a case of determining a serving cell based on a momentary channel state, it is preferable to measure the RSRP or the RSRQ, which is measured for the RRM, for a relatively long time instead of the momentary channel state. Similarly, in order to prevent a case of configuring a serving cell based on a channel state of a specific frequency band only in frequency domain, the RRM is performed in a manner of calculating an average of all bands. According to a legacy RRM, the RSRP and the RSRQ are measured for a relatively long time in response to signals received on all bands.

Figure 6:
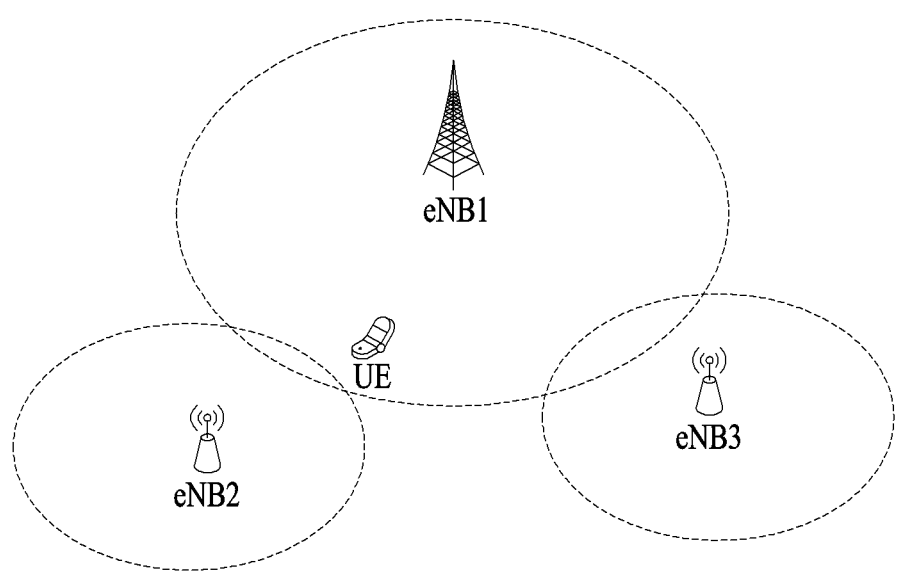

FIGS. 6 and 7 are diagrams illustrating a configuration of a heterogeneous network to explain a limited measurement technique.

FIG. 6 shows a case that transmit power between cells is significantly different from each other. Since such a cell using high power as an eNB1 covers a wider area, it is able to know that a problem of connecting too many UEs to a single serving cell occurs.

In order to solve the aforementioned problem, in performing the RRM, a limited measurement technique selectively using a signal at a certain time only is introduced as shown in FIG. 7. Referring to FIG. 7, if a cell of high power such as an eNB1 reduces transmit power of the cell or the power of the cell is configured as zero power, coverage of such a cell of low power as an eNB2 or an eNB3 can be efficiently enlarged. Regarding this, it shall be described in more detail with reference to the drawing.

FIG. 8 is a diagram illustrating a legacy limited measurement technique.

Referring to FIG. 8, an eNB1 is able to directly inform a neighboring cell that the eNB1 uses low power by selecting a part of subframes. Subsequently, the neighboring cell uses a low power subframe and may be then able to service UEs, which receives a strong signal from the eNB1, such as UEs shown in FIGS. 6 and 7 without any interference problem.

Hence, a channel state measurement can be properly performed only when the UEs measure an eNB2 or an eNB3 at a place in which the eNB1 uses low power. To this end, a network defines a set of subframes in which a specific cell is to be measured via such an upper layer signal as RRC and can indicate RRM measurement for the cell to be performed in a designated subframe only.

In this case, in case of frequency domain, the RRM measurement should be performed using signals of all bands in the designated subframe. As mentioned in the foregoing description, this is intended to prevent a case of selecting a serving cell based on signal quality of a specific frequency band only.

Meanwhile, as a newly introduced cell structure, a NCT (new carrier type), which is eliminating CRS overhead by considerably reducing legacy CRS (cell-specific RS) transmission and utilizing a lot more resources in traffic transmission, is under discussion. In a NCT cell, although each cell transmits an RS including a structure similar to a CRS such as a CRS and a TRS (tracking RS) for minimum time/frequency synchronization, a resource position to which the CRS is transmitted is considerably reduced compared to a legacy cell. For instance, the NCT cell can transmit a CRS in a specific subframe such as a subframe #0 and a subframe #5 only. Or, the NCT cell can transmit a CRS in a partial RB only (e.g., 6 RBs among all allocated RBs). Of course, the NCT cell can also be configured to transmit a CRS in a partial RB of a partial subframe only.

Since RRM should be performed in the NCT cell as well, a UE should measure an RS of the NCT cell. A reference signal, which becomes an object of performing the RRM in the NCT cell, may correspond to a CRS in which overhead is reduced, an RS similar to the CRS, or a CSI (channel state information) RS, which is transmitted with such a constant interval as 5 ms or 10 ms and is used as a reference signal of channel state information feedback. The above-mentioned both cases have a common characteristic in that the CRS and the CSI RS are transmitted in a partial subframe only to reduce RS overhead.

In spite of the above-mentioned NCT situation, it is preferable to apply the limited measurement mentioned earlier in FIGS. 6 and 7. Yet, since the CRS or the CSI-RS, which becomes the object of performing the RRM in the NCT cell, is already transmitted in a partial subframe, it is difficult to properly perform an operation of measuring an RS in a partial subframe shown in FIG. 8 in the NCT situation.

More specifically, since a subframe to which the CRS or the CSI-RS becoming the object of performing the RRM in the NCT cell is transmitted is already limited, if a RRM measurement subframe is additionally limited, a sample itself capable of performing the RRM measurement is excessively reduced and measurement accuracy gets considerably worse.

As an example, when the NCT cell transmits a CRS in a subframe #0 and a subframe#5 and a UE performs RRM using the CRS, if a subframe designated to perform the RRM measurement includes either the subframe #0 or the subframe #5 only, (e.g., the subframe #0 only), a subframe capable of being actually used for the RRM by the UE appears once in 10 ms. Hence, there exists a problem of taking too much time for a single RRM.

Therefore, when a measurement reference signal, which is used for the RRM, is transmitted in a partial subframe, if the RRM is performed by avoiding interference of a neighboring cell, the present invention proposes to select a partial area from frequency domain and perform the RRM measurement in the selected area only.

Figure 9:
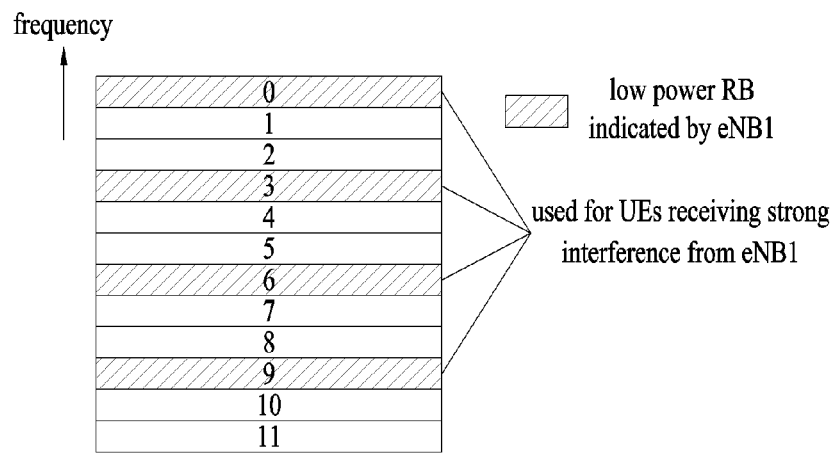
FIG. 9 is a diagram illustrating an example of a limited measurement technique in frequency domain according to an embodiment of the present invention.

FIG. 9 is a diagram illustrating an example of a limited measurement technique in frequency domain according to an embodiment of the present invention. In particular, FIG. 9 assumes a case that a UE avoids interference from an eNB1 and performs RRM for an eNB2 or an eNB3.

More specifically, the eNB1 using high power informs a neighboring cell of a set of RBs in which low power to be maintained via a backhaul link. Having received the set of RBs, the eNB2 and the eNB3 inform a UE, which receives strong interference from the eNB1, of a position of a corresponding RB and indicate the UE to perform RRM for the corresponding RB only.

And, since a UE connected with the eNB1 and the UE highly probable to access the eNB2 or the eNB 3 should perform RRM for the eNB2 or the eNB3, the eNB 1 informs the UE of a set of RBs in which low power to be maintained and indicates the UE to perform the RRM for the eNB2 or the eNB3.

The aforementioned operation can be called a limited RRM measurement technique in frequency domain. As mentioned in the foregoing description, a reference signal, which becomes an object of performing the limited RRM measurement in frequency domain, may correspond to a CRS or a CSI-RS transmitted in a limited subframe.

In the following, more specific embodiment for the limited RRM measurement in the frequency domain is explained.

If the limited RRM measurement in frequency domain is applied, reception power of a reference signal existing at a designated RB is used only for measuring RSRP. In case of RSRQ, an RSSI (received signal strength indicator) is measured using all signals received via the designated RB, e.g., a signal received from a common channel between a serving cell and a neighboring cell, an interference signal, a noise and the like, and the RSRQ is calculated using the previously calculated RSRP.

As mentioned in the foregoing description, since it is preferable to perform the RRM measurement for a relatively long time, if a specific RB is designated as an object of performing the RRM measurement, it is more preferable to consistently perform the RRM in the specific RB. Hence, when a specific eNB informs that the specific eNB configures low power RBs to perform RRM for a neighboring eNB, the specific eNB can additionally inform that low power will be constantly maintained in the low power RBs.

In particular, an RB to which low power is set for RRM can be differentiated from an RB to which low power is set to transmit data such as PDSCH. This is because, although transmit power or a setting position of the RB to which low power is set to transmit data is frequently changed, dynamic data scheduling such as a control channel transmitted in every subframe may be able to cope with the frequently changing transmit power or the setting position of the RB. In this case, the RB to which low power is set to transmit data can be appeared in such a form as RNTP (relative narrowband transmit power) information existing in a legacy 3GPP LTE system.

Hence, a specific eNB can transmit not only previously existing information on an RB to which low power is set but also information on a set of RBs to which low power is more constantly set (or a set of RBs to which low power is set for RRM or a set of RBs recommended to be used for RRM) to a neighboring eNB. In addition, the set of RBs to which low power is constantly set can be restricted to a subset of a set of RBs to which low power is set to transmit data.

The RB to which low power is set for the RRM can be restricted to be valid only in a subframe in which a reference signal, which becomes an object of performing the RRM, appears. For instance, if a specific RB is designated as an RB to which low power is set for the RRM, it is able to assume low power in the subframe in which the reference signal, which becomes the object of performing the RRM, appears. Yet, since it is not necessary to perform the RRM in other subframes, the subframes may be interpreted as subframes in which low power is not able to be assumed.

In particular, when the RRM is performed in response to a CRS transmitted in a subframe # 0 and a subframe #5 only, if a specific RB is set with low power for the RRM, low power can be assumed in the two subframes. Yet, it is able to assume that low power is not set to other subframes except the two subframes unless separate information is provided. In this case, the separate information may include a signal used for setting low power to transmit data. If low power is set to the corresponding RB to transmit data, it is able to assume low power as well.

In a subframe to which a reference signal becoming an object of performing the RRM is transmitted, information on an RB to which low power is set for the RRM has a priority. On the contrary, information on an RB to which low power is set to transmit data has a priority in other subframes. To this end, a specific eNB can deliver information on a subframe to which a reference signal becoming an object of performing the RRM is transmitted to a neighboring eNB via a backhaul link.

Meanwhile, in order to set a limited RRM measurement technique of frequency domain to a UE, it is necessary to inform a UE of an RB, which is used for measuring a specific cell. When a UE performs RRM for a serving cell, since the UE has already identified a bandwidth of the serving cell, it may be sufficient enough to inform the UE of an RB position only in which the RRM is to be performed in the bandwidth.

On the contrary, in case of performing RRM for a neighboring cell, since the UE does not identify a bandwidth of the neighboring cell, the UE is unable to precisely identify an RB position. Hence, in case of performing the RRM for the neighbor cell, it may consider such methods as A) to C) in the following to designate an RB in which the RRM is to be performed.

A) First of all, an eNB may inform a UE of a bandwidth of a neighboring cell and may be then able to designate a position of an RB, which becomes an object of performing the RRM, in the bandwidth.

Figure 10:
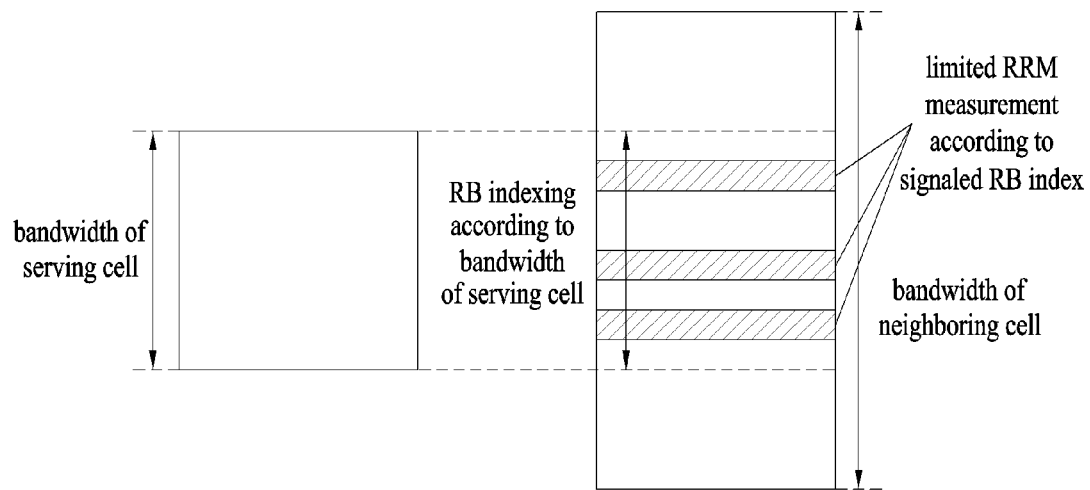
FIG. 10 is a diagram illustrating an example of designating an RB position to perform RRM for a neighboring cell according to an embodiment of the present invention.

B) Secondly, an eNB may designate a position of an RB, which becomes an object of performing the RRM, of a neighboring cell on the basis of a bandwidth of a serving cell. Regarding this, it is explained with reference to drawing. FIG. 10 is a diagram illustrating an example of designating an RB position to perform RRM for a neighboring cell according to an embodiment of the present invention.

Referring to FIG. 10, although an actual bandwidth of a neighboring cell may be different from a bandwidth of a serving cell, a UE performs RB indexing for frequency domain under an assumption that the bandwidth of the neighboring cell is identical to the bandwidth of the serving cell. Based on this, the UE performs RRM in an RB of an index signaled by the serving cell.

C) Lastly, the eNB may designate a position of an RB, which becomes an object of performing the RRM, of a neighboring cell on the basis of a predetermined specific bandwidth. The specific bandwidth may correspond to maximum bandwidth (e.g., 100 RBs) on a single component carrier or a single cell usable by a system. Regarding this, it is explained with reference to drawing.

Figure 11:
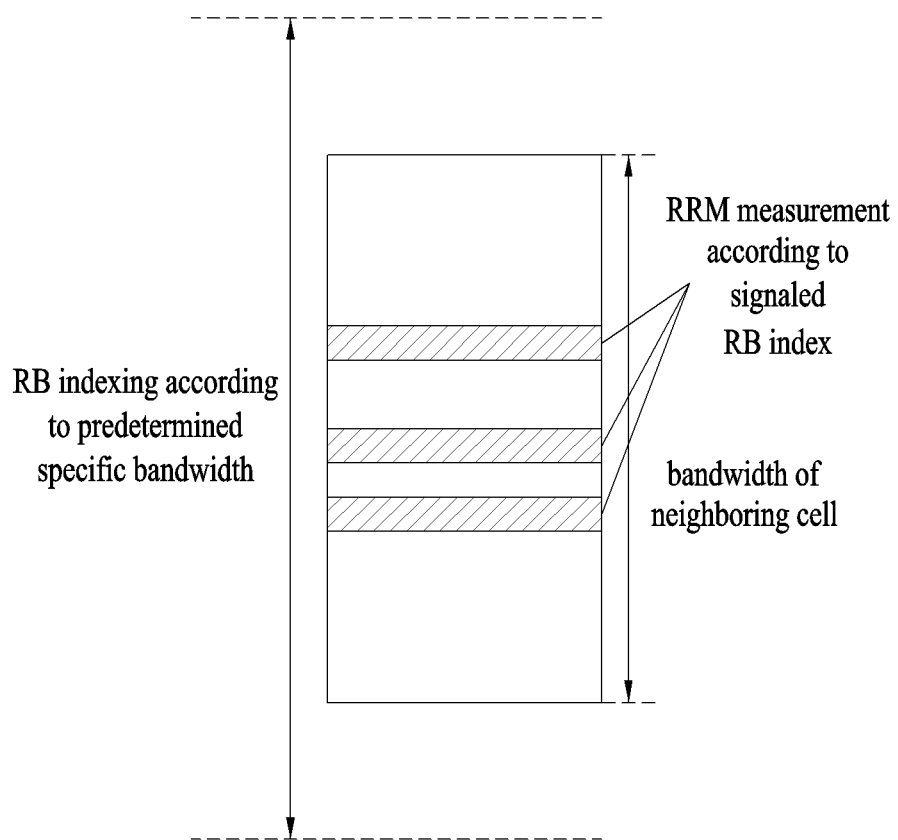
FIG. 11 is a diagram illustrating a different example of designating an RB position to perform RRM for a neighboring cell according to an embodiment of the present invention.

FIG. 11 is a diagram illustrating a different example of designating an RB position to perform RRM for a neighboring cell according to an embodiment of the present invention.

Referring to FIG. 11, although an actual bandwidth of a neighboring cell may be different from a predetermined specific bandwidth, a UE performs RB indexing for frequency domain under an assumption that the bandwidth of the neighboring cell is identical to the predetermined specific bandwidth. Based on this, the UE performs RRM in an RB of an index signaled by a serving cell.

In the aforementioned FIG. 9 to FIG. 11, although a case of discontinuously allocating RBs, which are used for RRM, has been explained, by which the present invention may be non-limited. RRM can also be performed in frequency domain consisting of continuous RBs.

In order to secure accuracy of RRM measurement by securing the minimum number of RBs as RRM, there may exist a lowest value in the number of RBs used for the RRM. As the lowest value of the number of RBs, the number of RBs corresponding to a minimum bandwidth provided by a system can be designated. If the minimum number of RBs always secures RRM measurement of a preferable level, the number of RBs configured by the RRM measurement can be fixed by a constant value all the time to minimize signaling overhead.

The aforementioned set of RBs performing RRM can be fixed or changed according to time.

In this case, when a set of RBs is fixed according to time, if a series of RB sets $\{RB\ \#n_0, RB\ \#n_1, RB\ \#n_{k-1}\}$ is signaled for a usage of RRM, a UE continuously performs the RRM in a corresponding RB set until the UE receives a new indication.

On the contrary, when a set of RBs is changed according to time, if a series of RB sets $\{RB\ \#n_0, RB\ \#n_1, RB\ \#n_{k-1}\}$ is used for a usage of RRM at a specific timing point, the RB set used for the usage of the RRM is changed to $\{RB\ \#m_0, RB\ \#m_1, RB\ \#m_{k-1}\}$ at a next timing point. If the RB set performing the RRM changes according to time, information on an RB set and information on a timing point should also be delivered between eNBs and between an eNB and a UE.

For instance, if a series of RB sets is defined and shared with each other, the RB sets can be configured in a manner that a first set is used at a first timing point and a second set is used at a second timing point. It is also necessary to share information indicating that a first set is used again after all RB sets are used.

Or, it is able to signal RB sets used at a first timing point only and RB sets which are to be used at remaining timing point can be derived from the RB set used at the first timing point. Specifically, if an RB set $\{RB\ \#n_0, RB\ \#n_1, RB\ \#n_{k-1}\}$ is designated to be used at a first timing point, it is able to designate an RB set $\{RB\ \#n_0+t*g, RB\ \#n_1+t*g, RB\ \#n_{k-1}+t*g\}$ to be used at a timing point #t. In this case, g corresponds to a parameter determining the extent of changing of an RB set according time. The g can be determined by an integer equal to or greater than 1. In order to prevent RRM from being repeatedly performed in an identical position, the g may correspond to a relative prime with the total number of RBs. In order to make indexes of RBs exist within a prescribed area after the change, it may be able to perform modula calculation on RB indexes constructing an RB set using the total number of RBs and the like.

In addition, a plurality of patterns of which an RB set is changing according to timing points are designated in advance and corresponding information can be delivered in a manner of selecting a pattern from a plurality of the patterns.

Figure 12:
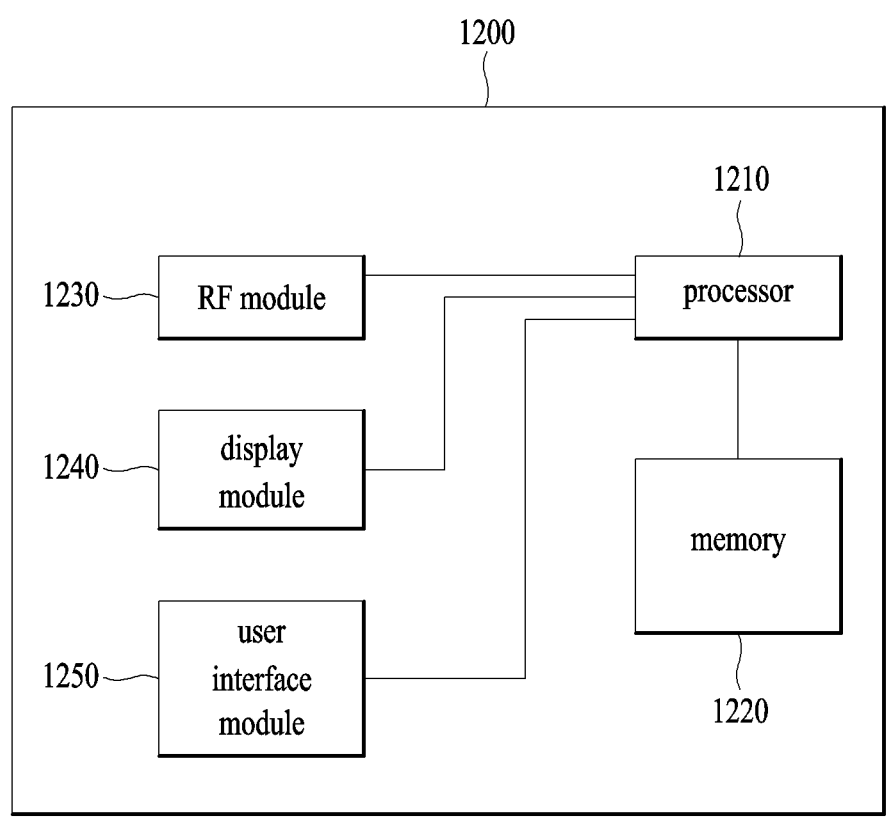
FIG. 12 is a block diagram of a communication apparatus according to an embodiment of the present invention.

FIG. 12 is a block diagram of a communication apparatus according to an embodiment of the present invention.

Referring to FIG. 12, a communication apparatus 1200 includes a processor 1210, a memory 1220, an RF module 1230, a display module 1240, and a User Interface (UI) module 1250.

The communication device 1200 is shown as having the configuration illustrated in FIG. 12, for the convenience of description. Some modules may be added to or omitted from the communication apparatus 1200. In addition, a module of the communication apparatus 1200 may be divided into more modules. The processor 1210 is configured to perform operations according to the embodiments of the present invention described before with reference to the drawings. Specifically, for detailed operations of the processor 1210, the descriptions of FIGS. 1 to 11 may be referred to.

The memory 1220 is connected to the processor 1210 and stores an Operating System (OS), applications, program codes, data, etc. The RF module 1230, which is connected to the processor 1210, upconverts a baseband signal to an RF signal or downconverts an RF signal to a baseband signal. For this purpose, the RF module 1230 performs digital-to-analog conversion, amplification, filtering, and frequency upconversion or performs these processes reversely. The display module 1240 is connected to the processor 1210 and displays various types of information. The display module 1240 may be configured as, not limited to, a known component such as a Liquid Crystal Display (LCD), a Light Emitting Diode (LED) display, and an Organic Light Emitting Diode (OLED) display. The UI module 1250 is connected to the processor 1210 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although a method of performing a limited measurement in frequency domain in a wireless communication system and an apparatus therefor are described with reference to examples applied to 3GPP LTE system, it may be applicable to various kinds of wireless communication systems as well as the 3GPP LTE system.

What is claimed is:

1. A method of performing a measurement for radio resource management (RRM) at a user equipment (UE) in a wireless communication system, the method comprising:
   receiving, by the UE, information on a low power frequency band of a neighboring cell for the RRM from a serving cell;
   performing, by the UE, a measurement on the low power frequency band of the neighboring cell for the RRM using a reference signal received with a predetermined period; and
   reporting, by the UE, a result of the measurement to the serving cell,
   wherein the information on the low power frequency band of the neighboring cell for the RRM comprises information on at least one or more resource block indexes to perform the measurement, and
   wherein the at least one or more resource block indexes vary according to a change of a time resource.

2. The method of claim 1, wherein the information on the low power frequency band of the neighboring cell for the RRM is valid in a subframe in which the reference signal is received.

3. The method of claim 1, wherein the at least one or more resource block indexes are defined based on a bandwidth of the serving cell, a maximum bandwidth, or a predetermined bandwidth.

4. The method of claim 1, further comprising:
   receiving, by the UE, information on the low power frequency band of the neighboring cell, which is used for receiving data, from the serving cell,
   wherein the information on the low power frequency band of the neighboring cell for the RRM is valid in a subframe in which the reference signal is received, and
   wherein the information on the low power frequency band of the neighboring cell, which is used for receiving the data, is valid in a subframe in which the reference signal is not received.

5. A user equipment (UE) in a wireless communication system, the UE comprising:
   a receiver configured to:
      receive information on a low power frequency band of a neighboring cell for radio resource management (RRM) from a serving cell, and
      receive a reference signal with a predetermined period;
   a processor configured to perform a measurement on the low power frequency band of the neighboring cell for the RRM using the reference signal; and
   a transmitter configured to report a result of the measurement to the serving cell,
   wherein the information on the low power frequency band of the neighboring cell for the RRM comprises information on at least one or more resource block indexes to perform the measurement, and
   wherein the at least one or more resource block indexes vary according to a change of a time resource.

6. The UE of claim 5, wherein the information on the low power frequency band of the neighboring cell for the RRM is valid in a subframe in which the reference signal is received.

7. The UE of claim 5, wherein the at least one or more resource block indexes are defined based on a bandwidth of the serving cell, a maximum bandwidth, or a predetermined bandwidth.

8. The user equipment of claim 5, wherein the receiver is further configured to receive information on the low power frequency band of the neighboring cell, which is used for receiving data, from the serving cell,
   wherein the information on the low power frequency band of the neighboring cell for the RRM is valid in a subframe in which the reference signal is received, and
   wherein the information on the low power frequency band of the neighboring cell, which is used for receiving the data, is valid in a subframe in which the reference signal is not received.

* * * * *